United States Patent
Yamada et al.

(10) Patent No.: US 10,090,701 B2
(45) Date of Patent: Oct. 2, 2018

(54) SOLAR POWER GENERATION SYSTEM

(71) Applicant: FUJI ELECTRIC CO., LTD., Kawasaki-shi (JP)

(72) Inventors: Ryuji Yamada, Hachioji (JP); Koji Kawaguchi, Chigasaki (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 427 days.

(21) Appl. No.: 14/822,738

(22) Filed: Aug. 10, 2015

(65) Prior Publication Data

US 2015/0349583 A1    Dec. 3, 2015

Related U.S. Application Data (63) Continuation of application No. PCT/JP2013/057916, filed on Mar. 20, 2013.

(51) Int. Cl.
*H02J 3/32* (2006.01)
*H02J 3/34* (2006.01)
(Continued)

(52) U.S. Cl.
CPC .............. *H02J 7/35* (2013.01); *G05F 1/67* (2013.01); *H02J 3/32* (2013.01); *H02J 3/385* (2013.01);
(Continued)

(58) Field of Classification Search
CPC ..... G05F 1/67; H02J 3/32; H02J 3/385; H02J 7/35; H02M 3/158; H02M 3/1584; Y02E 10/58; Y02E 70/30; Y10T 307/516
(Continued)

(56) References Cited

U.S. PATENT DOCUMENTS

2009/0284240 A1* 11/2009 Zhang ................ G05F 1/67
                                                        323/285
2011/0144822 A1*  6/2011 Choi ................. H02J 3/32
                                                        700/297
(Continued)

FOREIGN PATENT DOCUMENTS

CN   102403737 A   4/2012
CN   102655380 A   9/2012
(Continued)

*Primary Examiner* — Rexford Barnie
*Assistant Examiner* — Toan Vu
(74) *Attorney, Agent, or Firm* — Rabin & Berdo, P.C.

(57) ABSTRACT

A solar power generation system includes a plurality of solar cell groups, a plurality of chopper units each of which corresponds to one of the plurality of solar cell groups and raises a DC voltage obtained from the corresponding solar cell group. Each of the plurality of chopper units includes a first operating point control unit that respectively controls an output current of the corresponding chopper unit to optimize an operating point of each of the plurality of solar cell groups so as to obtain maximum power from the respective solar cell groups, and an inverter, which receives the DC voltage obtained from the plurality of chopper units and outputs AC power. The inverter includes a second operating point control unit that controls the DC voltage obtained from the plurality of chopper units to optimize the operating point of each of the plurality of solar cell groups.

7 Claims, 8 Drawing Sheets (51) Int. Cl.
*H02J 7/35* (2006.01)
*G05F 1/67* (2006.01)
*H02M 3/158* (2006.01)
*H02J 3/38* (2006.01)

(52) U.S. Cl.
CPC .......... *H02M 3/158* (2013.01); *H02M 3/1584* (2013.01); *Y02E 10/58* (2013.01); *Y02E 70/30* (2013.01); *Y10T 307/516* (2015.04)

(58) Field of Classification Search
USPC .......................................................... 307/82
See application file for complete search history.

(56) References Cited

U.S. PATENT DOCUMENTS

| | | | |
|---|---|---|---|
| 2011/0291479 A1* | 12/2011 | Lee | H02J 3/32 307/43 |
| 2012/0091800 A1 | 4/2012 | Shenoy et al. | |
| 2014/0062209 A1* | 3/2014 | Liu | H02J 1/102 307/82 |
| 2014/0152097 A1* | 6/2014 | Kitaji | H02J 1/10 307/19 |

FOREIGN PATENT DOCUMENTS

| | | |
|---|---|---|
| JP | H09-191579 A | 7/1997 |
| JP | H11-318042 A | 11/1999 |
| JP | 2000-112545 A | 4/2000 |
| JP | 2001-309560 A | 11/2001 |
| JP | 2002-199739 A | 7/2002 |
| JP | 2002-238246 A | 8/2002 |
| JP | 2004-180467 A | 6/2004 |
| JP | 2006-101581 A | 4/2006 |
| JP | 2012-143104 A | 7/2012 |

\* cited by examiner

SOLAR POWER GENERATION SYSTEM

CROSS-REFERENCE TO RELATED APPLICATION

This is a continuation application of International Application number PCT/JP2013/057916, which was filed on Mar. 20, 2013 and designated the United States. The disclosure of this earlier application is incorporated herein by reference.

BACKGROUND OF THE INVENTION

1. Field of the Invention

The present invention relates to a solar power generation system, by which DC power generated in a solar cell can be utilized efficiently and a high AC output voltage can be set.

2. Description of the Background Art

Recently, attention has been given to a solar power generation system that is interconnected with a system power supply, which is a commercial AC power supply system, by converting the DC power obtained from a solar cell into AC power. This solar power generation system is generally constituted by an inverter which converts the DC power obtained from a solar cell group comprising a plurality of solar cells into AC power of a predetermined frequency, and a transformer which supplies the AC power output by the inverter, to the system power supply.

The power obtained from the solar cells varies depending the intrinsic differences of the individual solar cells. Therefore, differences are certain to occur naturally in the power obtained from each of the plurality of solar cell groups, which are formed by grouping together a plurality of solar cells. Therefore, it has been proposed to make the voltages input to the inverter equal to each other by forming a plurality of solar cell groups by connecting solar cells which have similar output voltages together in parallel, and providing voltage adjustment means for each of these solar cell groups (see, for example, Patent Document 1).

Furthermore, in the abovementioned solar power generation system, the operating point of each solar cell group is controlled by controlling the output current of the inverter, for example, whereby the DC power obtained from the solar cell group is maximized. The control of the operating point of the solar cell group is called "maximum power point tracking" (MPPT) control.

Patent Document 1: Japanese Patent Application Publication No. 2001-309560

SUMMARY OF THE INVENTION

The DC power obtained from this solar cell group varies with the fluctuation in the amount of daylight and the temperature. Therefore, if the DC power generated by the solar cell group decreases and the output voltage declines, then the operation of the inverter becomes instable. Therefore, in general, in the prior art, when the output voltage of the solar cell group does not satisfy a previously set input voltage for the inverter, then it is ensured that the operation of the inverter is halted. Consequently, there is a problem in that the power generated by the solar cell group cannot be utilized adequately.

The present invention was devised in view of these circumstances, an object thereof being to provide a solar power generation system wherein an inverter can be operated stably, even when the voltage generated in the solar cell is low, and wherein a high AC output voltage of the inverter can be set.

In order to achieve the object described above, the solar power generation system according to the present invention basically includes: a chopper unit raising a DC voltage obtained from a solar cell; operating point control means for obtaining maximum output from the solar cell by controlling an output current of the chopper unit to optimize an operating point of the solar cell; and an inverter receiving input of a DC voltage obtained from the chopper unit, and converting the DC voltage into an AC power of a predetermined voltage and then outputting the AC power.

Desirably, the solar power generating system according to the present invention includes: a plurality of solar cell groups obtained by grouping a plurality of solar cells; a plurality of chopper units provided respectively to correspond with the plurality of solar cell groups and raising DC voltages obtained respectively from the solar cell groups; operating point control means for obtaining maximum output from the respective solar cell groups by respectively controlling the output currents of the chopper units so as to optimize the operating points of the solar cell groups; and an inverter receiving input of a DC voltage obtained from the plurality of chopper units, and converting the DC voltage into an AC power of a predetermined voltage and then outputting the AC power Incidentally, the inverter controls the AC output current such that the input voltage is uniform or is within a prescribed voltage range.

Desirably, the plurality of chopper units are each provided with a through function for halting the switching operation and directly outputting the input voltage, or shorting means for shorting an input and output of the chopper unit, when the output voltage of the solar cell group exceeds a predetermined input voltage of the inverter. The shorting means is formed by, for example, a rectifying diode, a mechanical contact switch or a synchronous rectifying circuit using a semiconductor switching element.

Furthermore, desirably, the inverter is provided with second operating point control means for changing the input voltage of the inverter to optimize the operating points of the solar cell groups, separately from the operating point control means based on the chopper units. Desirably, the second operating point control means sets the input voltage so as to be a lower limit value of an operating point search range for the solar cell group, when the power obtained from the solar cell group does not change even when the input voltage of the inverter is varied.

Desirably, the solar power generation system having the configuration described above further comprises a bi-directional chopper unit capable of bi-directional power flow, and a power storage device connected to an input end of the inverter via the bi-directional chopper unit. More specifically, the bi-directional chopper unit stores surplus power, which is supplied to the inverter from the plurality of chopper units, in the power storage device and outputs power, which is stored in the power storage device, to the inverter, when the power supplied to the inverter from the plurality of chopper units is insufficient.

In this case, desirably, the charging and discharging control of the power storage device via the bi-directional chopper unit is carried out gradually compared to the control by the second operating point control means in the inverter. Moreover, the plurality of chopper units and the inverter may be provided together in a power collector unit which collects power from the plurality of solar cell groups. In this case, desirably, the inverter has a role of carrying out AC conversion and an interconnecting operation with a system power supply.

According to the solar power generation system having the configuration described above, a DC voltage obtained from the solar cell group is raised via a chopper unit and then input to an inverter, and therefore the lower limit value of the input voltage of the inverter can be set to a high value. Consequently, even if the output voltage falls due to decline in the DC power generated by the solar cell group, since the input voltage of the inverter is raised via the chopper unit, then stable operation of the inverter can be guaranteed. It is possible to efficiently utilize the DC power generated by the solar cells.

Since the input voltage of the inverter can be raised, then it is possible readily to set the AC output voltage of the inverter to a high value. Therefore, it is possible to reduce the output current of the inverter with respect to the same output power. The conduction loss in the inverter is reduced in accordance with the reduction in the output current of the inverter, and furthermore, the size of the apparatus can be reduced, and the diameter of the wiring for supplying the output power to the system power supply can be reduced. Therefore, a beneficial effect is obtained in that the overall system can be configured in a simple and also inexpensive fashion.

Furthermore, by providing the shorting means in the chopper unit, it is possible to input the output power of the solar cell group to the inverter by bypassing the chopper unit, when the output voltage of the solar cell group is high, and the loss in the chopper unit can be suppressed. Moreover, if the operating point of the solar cell group is optimized by the second operating point control means, then the operating point control means in the chopper unit also tracks this optimization. Therefore, it is possible to optimize the operating points in a plurality of solar cell groups, simultaneously.

Furthermore, by providing a power storage device which is connected to the input end of the inverter via the bi-directional chopper unit, the DC power obtained from the solar cell group is utilized efficiently, and if the DC power obtained from the solar cell group is insufficient, then this insufficiency can be compensated for by power stored in the power storage device. Therefore, a beneficial effect is obtained in that the AC output power of the inverter can be stabilized, or the like.

Moreover, if a so-called mega solar power system is constructed using the solar power generation system according to the present invention, a beneficial effect occurs in that stable power supply can be achieved while suppressing equipment costs.

DETAILED DESCRIPTION OF THE INVENTION

Below, a solar power generation system according to the present invention is described with reference to the drawings.

Figure 1:
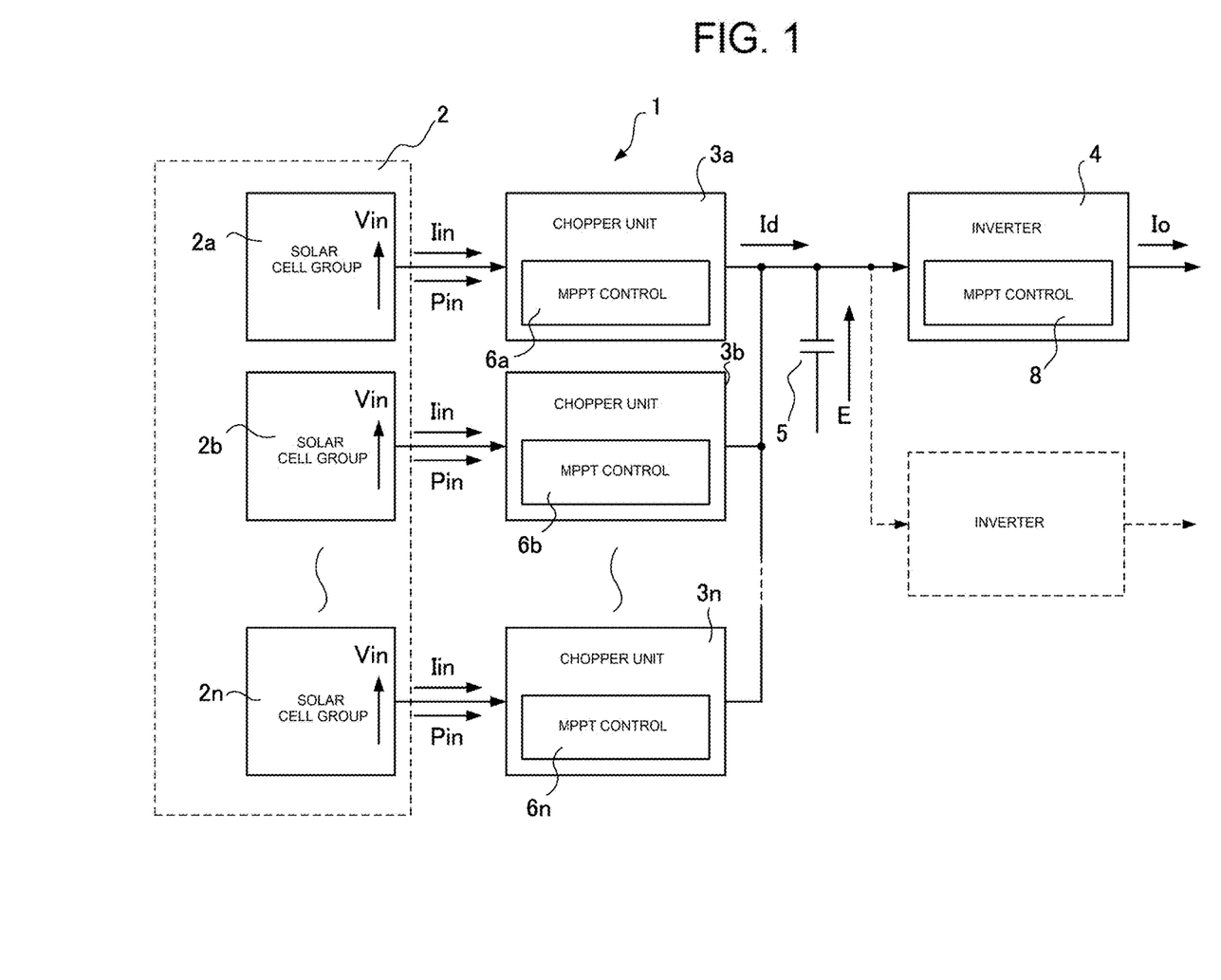
FIG. 1 is an overall schematic drawing of a solar power generation system relating to one example of the present invention.

FIG. 1 is a general schematic drawing of a solar power generation system 1 relating to an example of the present invention, and numeral 2 is a solar cell group in which a predetermined number of solar cells are connected in series/parallel. This solar cell group 2 consists of solar cell panels, for example, which receive sunlight and generate a predetermined power P by a photoelectric conversion action. Furthermore, here, an example is given in which a plurality of solar cell groups 2a, 2b to 2n are disposed in parallel.

Here, the characteristic feature of the solar power generation system 1 is that a plurality of chopper units 3a, 3b to 3n are disposed so as to correspond to the solar cell groups 2a, 2b to 2n. These chopper units 3a, 3b to 3n serve respectively to increase the output voltage (DC voltage) of the solar cell groups 2a, 2b to 2n. The inverter 4 which converts the DC power obtained respectively from the solar cell groups 2a, 2b to 2n, to an AC power of a predetermined voltage, is disposed in a stage after the plurality of chopper units 3a, 3b to 3n. In other words, the inverter 4 is provided so as to operate by receiving input of output power from the chopper units 3a, 3b to 3n.

The output current from the chopper units 3a, 3b to 3n is stored in a capacitor 5 and then supplied to the inverter 4 and a predetermined DC voltage E. The inverter 4 converts the input DC voltage E to an AC power of a predetermined voltage, and outputs the AC power. The inverter 4 is basically provided with a function for controlling the AC output current Io in such a manner that the input voltage E is uniform or comes within a predetermined voltage range. The AC power output from the inverter 4 is supplied to a system power supply via a transformer (not illustrated).

Here, the chopper units 3a, 3b to 3n are respectively provided with operating point control means 6a, 6b to 6n which maximize the output power of the solar cell groups 2a, 2b to 2n. The operating point control means 6a, 6b to 6n are formed of maximum power point tracking (MPPT) control means, which optimize the operating points of the solar cell groups 2a, 2b to 2n by controlling the output current Id of the chopper units 3a, 3b to 3n, and obtain maximum output from the solar cell groups 2a, 2b to 2n.

Furthermore, the chopper units 3a, 3b to 3n are provided with a function (through mode) which halts switching operation of these units and outputs the input voltage Vin, directly as a voltage E, when the output voltage from the solar cell groups 2a, 2b to 2n, in other words, the input voltage Vin of the chopper units 3a, 3b to 3n, is greater than the predetermined input voltage E of the inverter 4. This function (through mode) serves to prevent the occurrence of switching loss in the chopper units 3a, 3b to 3n.

Figure 2:
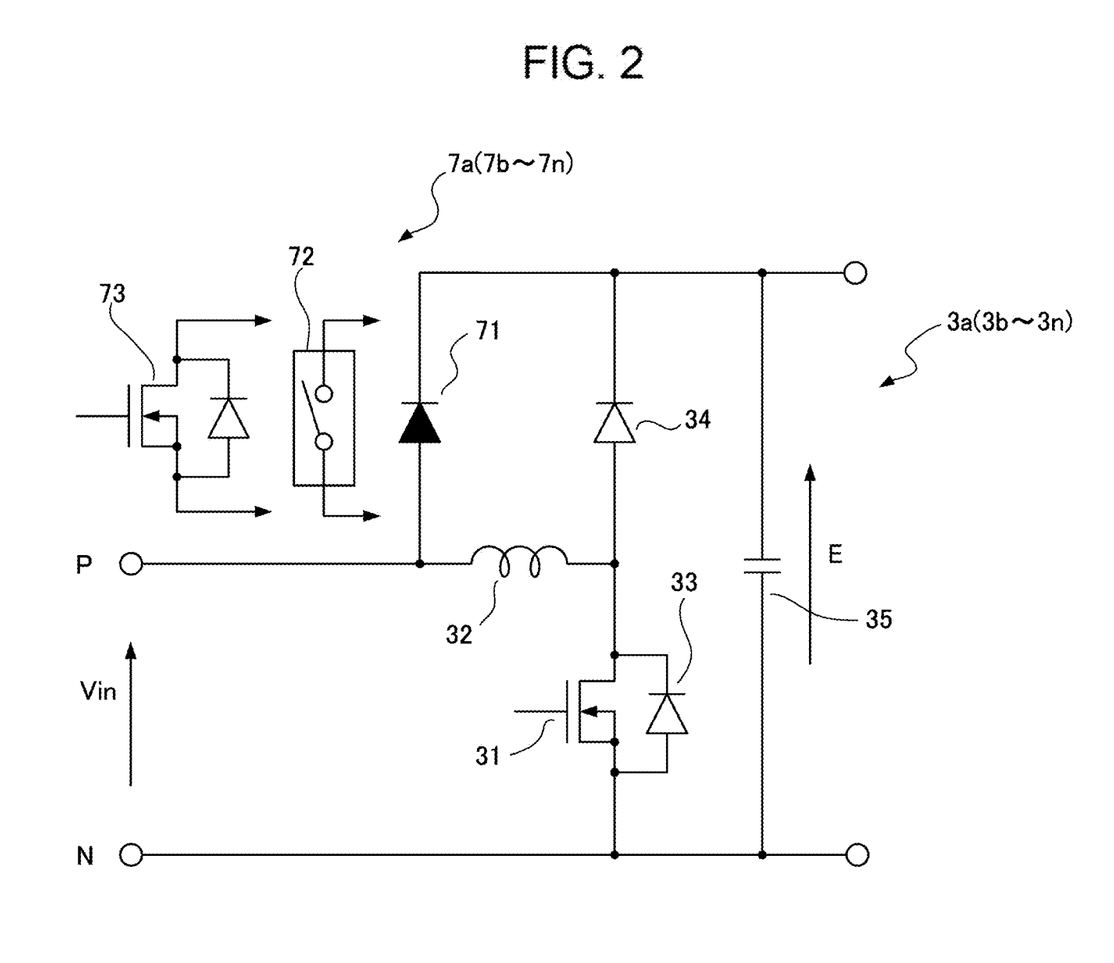
FIG. 2 is a principal schematic drawing of a chopper unit in the solar power generation system shown in FIG. 1.

In other words, the chopper units 3a, 3b to 3n are each provided with a semiconductor switching element (MOSFET) 31 which is connected to the input terminal via the inductor 32, as indicated by the schematic view of the main configuration of the chopper units as shown in FIG. 2, for example. Here, 33 is a freewheeling diode which is connected inversely in parallel to the semiconductor switching element 31, and 34 is a rectifying diode which directs the output of the inductor 32 to an output terminal. 35 is a capacitor which is connected to the output terminal of the chopper unit 3.

The chopper units 3a, 3b to 3n configured in this way store electromagnetic energy in the inductor 32 when the semiconductor switching element 31 is on. When the semiconductor switching element 31 is off, the input voltage is merged with the counter electromotive force generated in the inductor 32, and is output via the rectifying diode 34. By this means, the chopper units 3a, 3b to 3n raise and output the input voltage.

The semiconductor switching element (for example, MOS-FET) 31 which constitutes the main configuration of each of the chopper units 3a, 3b to 3n exhibits resistance properties when current is passed therethrough. With respect to the resistance properties, by connecting a plurality of the semiconductor switching elements 31, for example, in parallel, it is possible to make resistance theoretically as close as possible to zero (0). Furthermore, the same can also be said when the rectifying diode 34 is substituted with the MOS-FET, which is used as a rectifying element on the basis of the reverse-direction conducting properties thereof. Incidentally, even when an infinite parallel arrangement of the rectifying diodes 34 is used, since the forward voltage decline in the diode has a fixed voltage component with respect to the current, then this voltage decline cannot become lower than a certain value.

Furthermore, in the chopper units 3a, 3b to 3n, switching loss is certain to occur in the semiconductor switching element 31 due to the switching operation of these units. This switching loss includes charge/discharge loss due to parasitic capacitance in the semiconductor switching element 31 and/or reverse recovery loss in the parasitic diode. When a plurality of semiconductor switching elements 31 are used in parallel and the resistance when passing current is reduced, as described above, then the charging/discharging loss and reverse recovery loss described above increases, conversely. As a result of this, the switching loss in the chopper units 3a, 3b to 3n increases.

In this respect, if the chopper units 3a, 3b to 3n are provided with the through mode function described above, then it is possible to eliminate the problem of switching loss in the semiconductor switching element 31, simply by halting the switching operation of these units when the output voltage of the solar cell groups 2a, 2b to 2n is high. The output voltage of the solar cell groups 2a, 2b to 2n can be supplied directly to the inverter 4, with good efficiency.

It is useful if the chopper units 3a, 3b to 3n are provided with respective short circuits 7a, 7b to 7n which short the input and output terminals of the chopper units 3a, 3b to 3n, whereby the input voltage Vin is output directly as the voltage E. These short circuits 7a, 7b to 7n are made up of any one of a low-frequency rectifying diode 71, a mechanical contact switch 72, or a synchronous rectifying circuit 73 using a semiconductor switching element, or a combination of these, as shown in FIG. 2. The short circuits 7a, 7b to 7n serve to direct the voltage Vin applied to the input terminal, directly to the output terminal, by bypassing (passing through) the chopper units 3a, 3b to 3n.

The short circuits 7a, 7b to 7n of this kind do not perform a switching operation, but rather simply bypass the main body of the chopper units 3a, 3b to 3n and pass the DC power through from the input side to the output side. Therefore, by using the chopper units 3a, 3b to 3n which are provided with the short circuits 7a, 7b to 7n, there is no occurrence of the problem of switching loss described above.

The inverter 4 is provided with a function for controlling the AC output current Io in such a manner that the input voltage E is uniform or comes within a predetermined voltage range, as described above. In addition to this function, the inverter 4 is provided with a second operating point control means 8 which changes the input voltage E of the inverter 4 so as to optimize the operating point of the solar cell groups 2a, 2b to 2n. This second operating point control means 8 is made up of maximum power point tracking (MPPT) control means, provided separately from the operating point control means (MPPT) 6a, 6b to 6n in the chopper units 3a, 3b to 3n, which changes the operating point in such a manner that the output power of the solar cell groups 2a, 2b to 2n of the system, which has been set to through mode, becomes a maximum.

Figure 3:
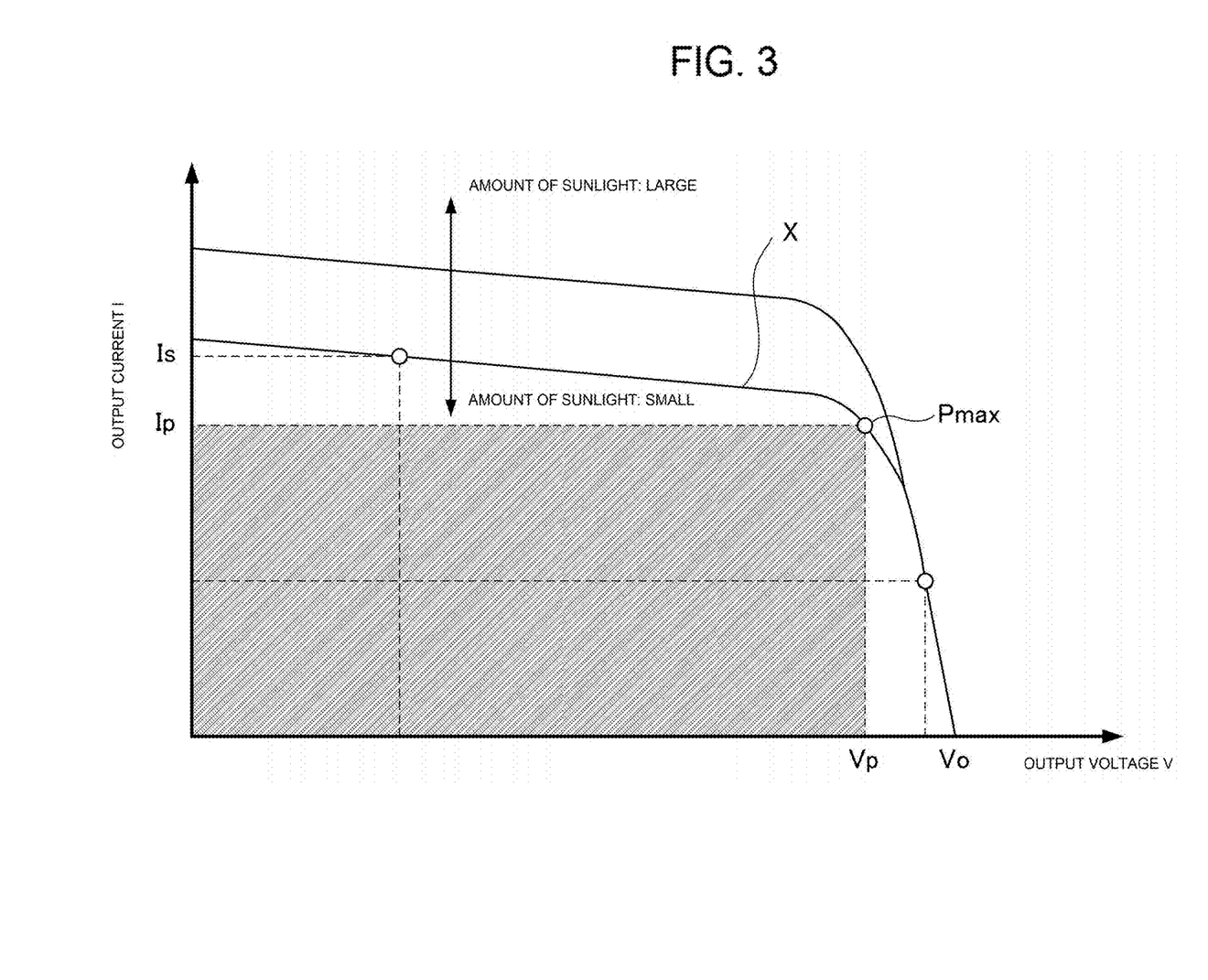
FIG. 3 is a diagram showing the voltage/current characteristics of the solar cell group.

Here, before describing the optimization control for the operating point of the solar cell groups 2a, 2b to 2n, in other words, the maximum power point tracking (MPPT) control, which is performed by the operating point control means 6a, 6b to 6n, and the second operating point control means 8, a brief description will be given of the characteristics of the solar cell group 2 (2a, 2b to 2n). The solar cell group 2 has output voltage/output current characteristics (V-I characteristics) such as those shown in FIG. 3, for example, and the output current I changes with the amount of sunlight and the temperature. In FIG. 3, X indicates the V-I characteristics for a uniform sunlight amount (with a light source), and if the output voltage V becomes higher than a certain level, the output current I falls dramatically. Here, Is represents the shorting current of the solar cell group 2 and Vo represents the open voltage of the solar cell group 2.

Figure 4:
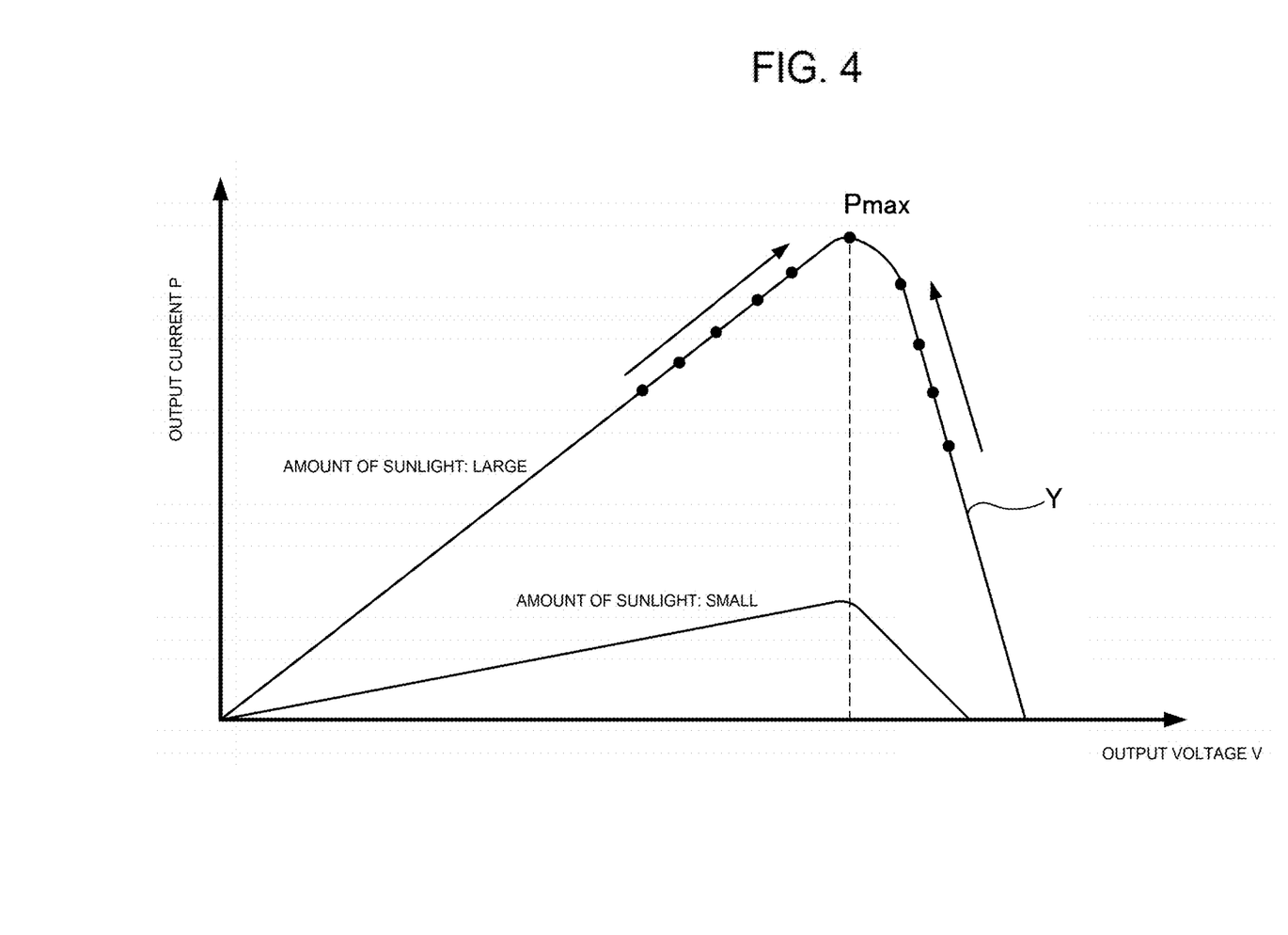
FIG. 4 is a diagram showing the relationship between the output voltage and the output power of a solar cell group.

As is clear from the V-I characteristics X shown in FIG. 3, the output current I from the solar cell group 2 declines when the output voltage V of the solar cell group 2 rises. Conversely, when the output current I from the solar cell group 2 rises, then the output voltage V of the solar cell group 2 declines. The output power P of the solar cell group 2 with respect to the output voltage V changes as indicated by the V-P characteristics Y in FIG. 4, for example. As a result of this, when the operating point (output voltage) V of the solar cell group 2 is optimized, the power P which can be extracted from the solar cell group 2 becomes a maximum.

The V-I characteristics X and the V-P characteristics Y of the solar cell group 2 change with the operating conditions, such as the amount of sunlight and/or temperature, etc., and therefore the optimal operating point Vp of this group also changes. Consequently, the maximum power point tracking (MPPT) control described above is implemented basically by monitoring the output power P while altering the output voltage (operating point voltage) V of the solar cell group 2, and changing the output voltage (operating point) V so as to increase the output power P.

The optimization control of the operating points of the solar cell groups 2a, 2b to 2n which is performed by the operating point control means 6a, 6b to 6n and the second operating point control means 8 is carried out as follows. In other words, the operating point control means 6a, 6b to 6n execute maximum power point tracking (MPPT) control, individually, in accordance with the characteristics of the solar cell groups 2a, 2b to 2n. The operating points of the solar cell groups 2a, 2b to 2n are respectively optimized, whereby the maximum power P is extracted respectively from each of the solar cell groups 2a, 2b to 2n.

In this case, when the optimal operating point voltage of the solar cell groups 2a, 2b to 2n, in other words, the input voltage Vin of the chopper units 3a, 3b to 3n, exceeds the input voltage E of the inverter 4, then the chopper units 3a, 3b to 3n are set to through mode, as described above. The chopper units 3a, 3b to 3n directly output the input voltage Vin obtained from the solar cell groups 2a, 2b to 2n.

Figure 5:
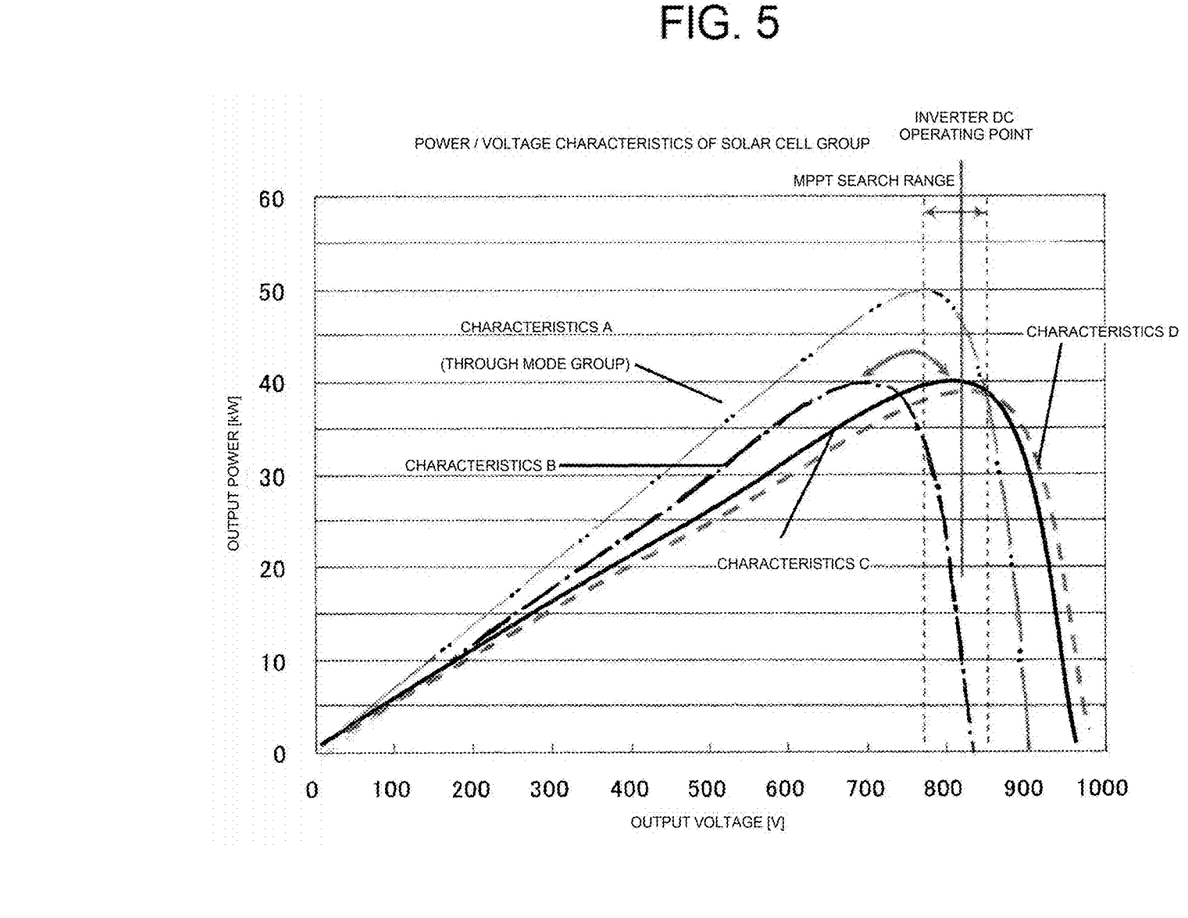
FIG. 5 is a diagram for illustrating operating point control for a plurality of solar cell groups.

FIG. 5 respectively show the V-I characteristics of the four solar cell groups 2a, 2b to 2n, and the characteristics A show the V-I characteristics of a solar cell group set to through mode, in the chopper unit 3a, 3b to 3n. Furthermore, characteristics B, C and D respectively show the V-I characteristics of a solar cell group when the output voltage is lower than a solar cell group which has been set to through mode, and the voltage has been raised k times in the chopper unit 3a, 3b to 3n.

The actual operating point for obtaining the maximum power from the solar cell groups 2a, 2b to 2n in which the voltage has been raised via the chopper units 3a, 3b to 3n does not change with the abovementioned increase in voltage. Consequently, only the voltage which is raised and output via the chopper units 3a, 3b to 3n is shifted by k times. Furthermore, when there is no solar cell group set to through mode, then needless to say, the output voltages of all of the solar cell groups 2a, 2b to 2n are respectively raised by k times.

On the other hand, the second operating point control means 8 adjusts the output current of the inverter 4 in such a manner that the output voltage of the solar cell group which has been set to through mode becomes a maximum, whereby the input voltage E of the inverter 4 is changed. Therefore, in the chopper units 3a, 3b to 3n carrying out the voltage raising operation, the maximum power point tracking (MPPT) control is carried out in accordance with the change in the input voltage E.

Therefore, the voltage Vin obtained from the solar cell groups 2a, 2b to 2n changes due to this maximum power point tracking (MPPT) control. Consequently, the chopper units 3a, 3b to 3n change a input voltage ratio thereof, in other words, the voltage conversion rate k, so as to generate and output the input voltage E of the inverter 4. As a result of this, the output voltage of the chopper units 3a, 3b to 3n changes in accordance with the change in the input voltage E of the inverter 4. Therefore, maximum power point tracking (MPPT) control is implemented in the solar cell groups 2a, 2b to 2n by the second operating point control means 8 of the inverter 4, via the chopper units 3a, 3b to 3n.

If there is no solar cell group set to through mode, then the second operating point control means 8 changes the input voltage E of the inverter 4 so that the input voltage E exhibits a certain value within an operating point search range of the maximum power point tracking (MPPT) control described above. Incidentally, when all of the chopper units 3a, 3b to 3n carry out maximum power point tracking (MPPT) control in relation to the solar cell groups 2a, 2b to 2n, then even if the input voltage E changes, there is no corresponding change in the output voltage of the solar cell groups 2a, 2b to 2n. As a result of this, there is a concern about the input voltage E becoming instable.

Therefore, when there is virtually no change in the power obtained from the solar cell groups 2a, 2b to 2n, even if the input voltage E varies, then the second operating point control means 8 sets the input voltage E of the inverter 4 to a certain predetermined value within the operating point search range of the maximum power point tracking (MPPT) control, as described above. This value can be set as the lower limit value of the operating point search range, for example. As a result of this, the solar cell group which has a possibility of being set to through mode can be increased in the chopper units 3a, 3b to 3n, and it is possible to avoid the problem of the input voltage E becoming instable as described above. By setting the through mode, it is possible to reduce the switching loss in the chopper units 3a, 3b to 3n.

Consequently, according to the second operating point control means 8, it is possible to reduce the switching loss by setting the chopper units 3a, 3b to 3n which operate in through mode. Furthermore, simultaneously with this, the maximum power point tracking (MPPT) control performed by the chopper units 3a, 3b to 3n in relation to the solar cell groups 2a, 2b to 2n can be undertaken by the inverter 4. Therefore, it is possible to achieve coordinated operation of the operating point control means 6a, 6b to 6n and the second operating point control means 8, and maximum power can be extracted efficiently from the solar cell groups 2a, 2b to 2n.

When the maximum power point tracking (MPPT) control is carried out respectively in the chopper units 3a, 3b to 3n, then the input power of the inverter 4 is uniform, irrespective of the input voltage E of the inverter. When the maximum power point tracking (MPPT) control is carried out by the second operating point control means 8 of the inverter 4 in this state, the input voltage E becomes instable as described above.

Figure 6:
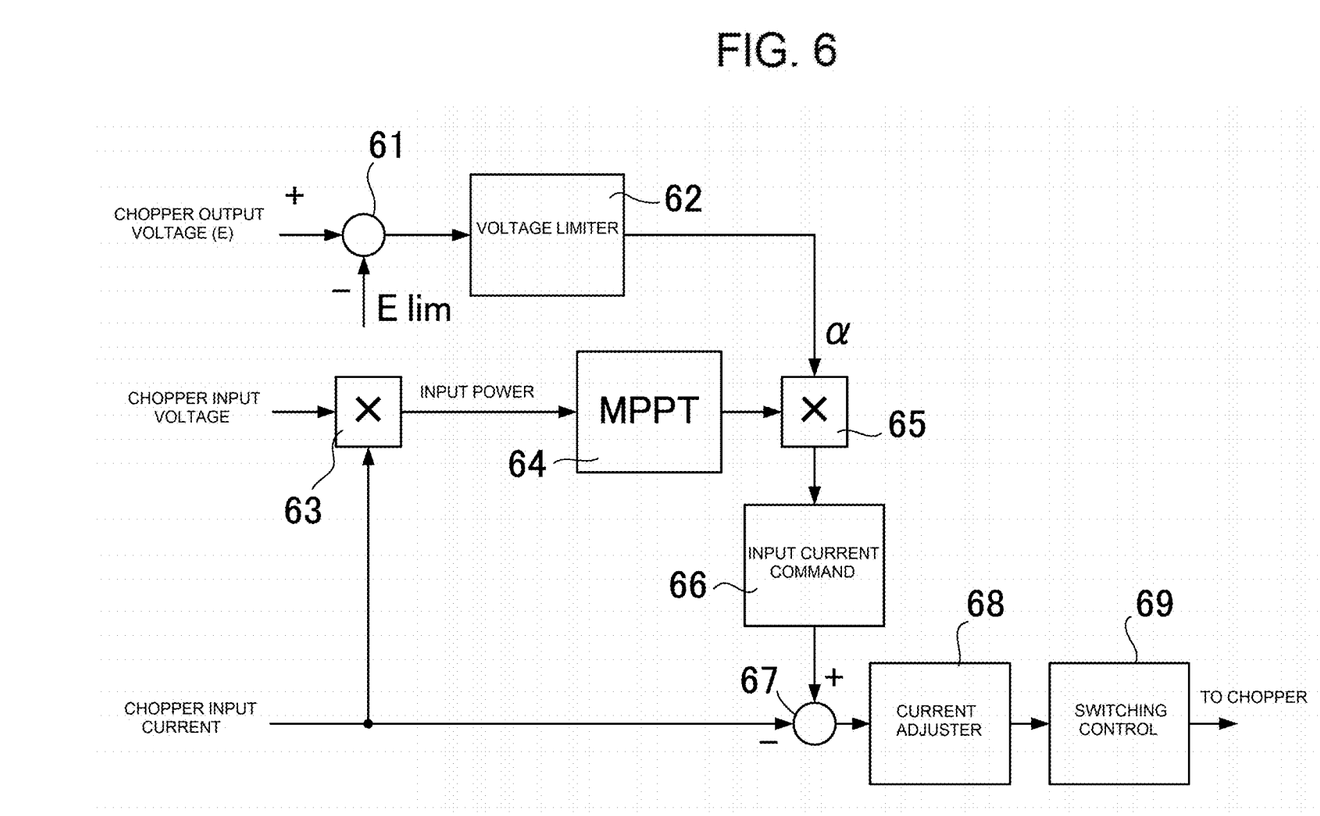
FIG. 6 is a control block diagram showing output voltage narrowing control in a chopper unit.

Therefore, narrowing the output voltage of the chopper unit 3a (3b to 3n) (the input voltage of the inverter 4) E under control such as that shown in FIG. 6, for example, is useful in order to avoid the problem described above. In other words, the differential between the output voltage E of the chopper unit 3a (3b to 3n) and a limit value of the output voltage, Elim, is determined by a differentiator 61. A coefficient cc relating to the maximum power point tracking (MPPT) control is determined by a voltage limiter 62 in accordance with the voltage differential (E−Elim) determined by the differentiator 61.

This coefficient α is given as a value which, for example, is ($\alpha$=1) when [E≤Elim], is ($\alpha$=0) when [Emax<E], and decreases in proportion to the voltage differential (E−Elim) in a range of (0 to 1) when [Elim<E≤Emax]. The coefficient cc is multiplied by a current command value determined by an MPPT control unit 64 in accordance with the input power P, to determine the input current command value 66. The input power P is determined by multiplying the input voltage and input current at the chopper unit 3a (3b to 3n), in a multiplier 63. Furthermore, the input current command value 66 is determined by multiplying a current command value determined by the MPPT control unit 64, by the coefficient cc, in the multiplier 65.

The differential between the input current command value 66 determined in this way and the input current to the chopper unit 3a (3b to 3n) is determined by a differentiator 67. In addition, control information relating to the switching control unit 69 is generated by a current adjuster 68 in accordance with the output of the differentiator 67, and the operation of the chopper unit 3a (3b to 3n) is controlled by the switching control unit 69.

Figure 7:
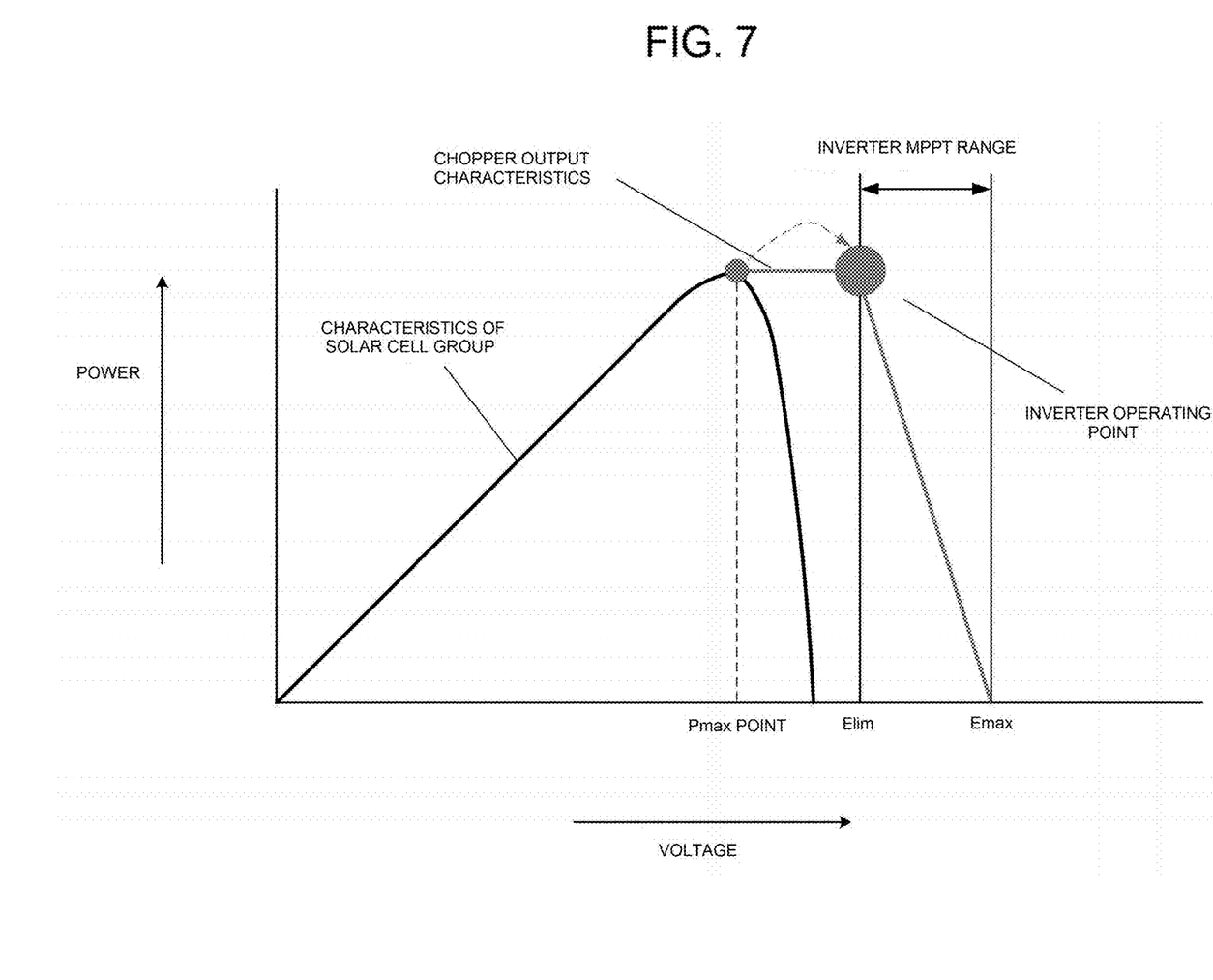
FIG. 7 is a characteristics diagram for describing the output voltage narrowing control shown in FIG. 6, and the effects thereof.

By means of this kind of narrowing control of the output voltage E, the output characteristics of the chopper unit 3a (3b to 3n) can be expanded to a voltage range that enables the inverter 4 to carry out maximum power point tracking (MPPT) control, as shown in FIG. 7. When the output voltage E of the chopper unit 3a (3b to 3n) exceeds the limit value Elim, then the output power of the chopper unit 3a (3b to 3n) can be narrowed.

As a result of this, the maximum output power point of the chopper unit 3a (3b to 3n) as viewed from the inverter 4 can be shifted (guided) towards the search range of the maximum power point tracking (MPPT) control in the inverter 4. Therefore, even if maximum power point tracking (MPPT) control is carried out in the inverter 4, it is possible to avoid the problem of instability of the output voltage E of the chopper units 3a, 3b to 3n and hence of the input voltage E of the inverter 4.

Furthermore, by carrying out control of this kind, it is possible to avoid a problem of abnormal increase in the output voltage E of the chopper units 3a, 3b to 3n, even if a situation arises in which the inverter 4 cannot output sufficient power due to control lag in the inverter 4 or problems on the system power supply side, for example. In other words, when the inverter 4 cannot output power, there is a risk that the input voltage E of the inverter 4 will increase abnormally due to the power which is supplied compulsorily from the chopper units 3a, 3b to 3n. However, since the output power of the chopper units 3a, 3b to 3n can be narrowed by the control described above, then beneficial effects are displayed in that it is possible to prevent, in advance, abnormal increase in the output voltage E, and a state of overvoltage can be prevented effectively.

Figure 8:
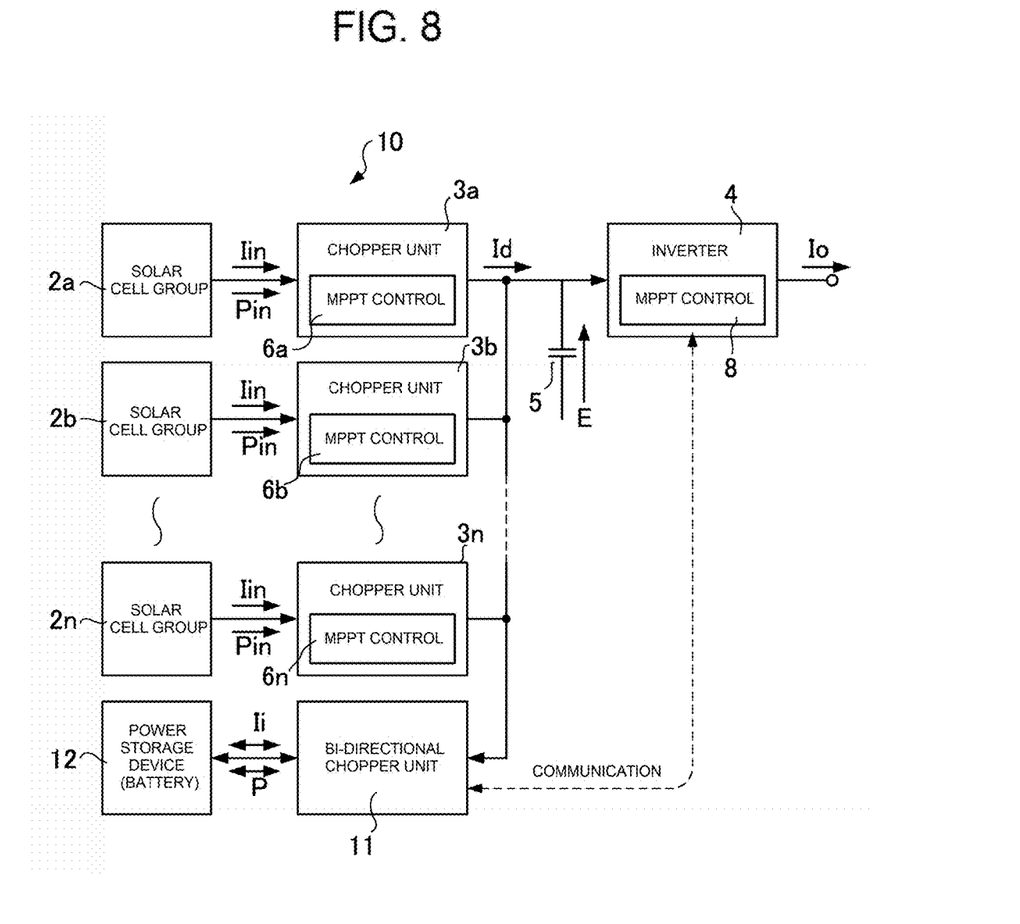
FIG. 8 is an overall schematic drawing of a solar power generation system relating to a further example of the present invention.

Next, a solar power generation system relating to a second example of the present invention will be described with reference to FIG. 8.

This solar power generation system 10 is provided with a bidirectional chopper unit 11 capable of bi-directional power flow, and a power storage device (battery) 12 connected to the input end of the inverter 4 via the bi-directional chopper unit 11, in addition to the solar power generation system 1 relating to the first example which was described above. In FIG. 8, portions, which are the same as those of the solar power generation system 1 shown in FIG. 1, are labelled with the same reference numerals, and repeated description thereof is omitted here. Furthermore, it is of course possible to provide a plurality of sets of the bi-directional chopper unit 11 and the power storage device 12, in a parallel arrangement.

The bi-directional chopper unit 11 serves to store, in the power storage device 12, the surplus power which has been supplied to the inverter 4 from the plurality of chopper units 3a, 3b to 3n. Furthermore, when the power supplied to the inverter 4 from the plurality of chopper units 3a, 3b to 3n is insufficient, the bi-directional chopper unit 11 outputs the power stored in the power storage device 12, to the inverter 4, and thereby serves to supplement the insufficiency in the power described above.

The charging and discharging of the power storage device 12 via the bi-directional chopper unit 11 is controlled by communication of information with the inverter 4. In other words, the control unit of the inverter 4 issues a charging instruction to the bi-directional chopper unit 11, when the power obtained from the solar cell groups 2a, 2b to 2n is higher than the output power from the inverter 4 in a steady state, for example. The bi-directional chopper unit 11 implements driving of charging and hence stores the surplus power output from the chopper units 3a, 3b to 3n in the power storage device 12.

Furthermore, the control unit of the inverter 4 issues a discharging instruction to the bi-directional chopper unit 11, in cases where, for example, the load on the system power supply is a peak, and the power output to the system power supply on the basis of the power obtained from the solar cell groups 2a, 2b to 2n alone is insufficient. The bi-directional chopper unit 11 implements of driving of discharging and hence the power stored in the power storage device 12 is output to the inverter 4. As a result of this, the inverter 4 is able to convert power obtained by adding the power obtained from the power storage device 12 to the power obtained from the solar cell groups 2a, 2b to 2n, to an AC power of a predetermined voltage, and output this DC power to the system power supply. In other words, the inverter 4 is able to output an AC power which exceeds the amount of power generated by the solar cell groups 2a, 2b to 2n at that time.

In this case, desirably, the charging and discharging instructions from the inverter 4 to the bi-directional chopper unit 11 are made gradually over a sufficiently long period of time compared to the maximum power point tracking control in the inverter 4 which is described above. According to this gradual charging and discharging control of the bi-directional chopper unit 11, it is possible to regard the power storage device 12 as a constant-power source as viewed from the inverter 4. In this case, virtually no change occurs in the power which is obtained from the bi-directional chopper unit 11, in respect to the change in the input voltage E of the inverter 4. As a result of this, there is no effect on the aforementioned maximum power point tracking control relating to the solar cell groups 2a, 2b to 2n. Consequently, it is possible to achieve steady waste-free supply of power using the power storage device 12, in combination with highly efficient use of the solar cell groups 2a, 2b to 2n by the maximum power point tracking control.

When charging or discharging the power storage device 12 as described above, it is also useful if the bi-directional chopper unit 11, for instance, notifies the control unit of the inverter 4 about the amount of power charged to, or discharged from, the power storage device 12. By adopting this configuration, in the inverter 4, it is possible to change the amount of control relating to the output current Io when the input voltage E is altered in accordance with the amount of power notified by the bi-directional chopper unit 11. Consequently, it is possible to implement the maximum power point tracking control in relation to the solar cell groups 2a, 2b to 2n described above, by control for varying the input voltage E, separately from the charging and discharging of the power storage device 12.

Moreover, instead of supplying the amount of charged/discharged power of the power storage device 12 to the inverter 4, this operation may also be controlled by supplying a power command value to the inverter 4. In this case, desirably, the power command value generated by the bi-directional chopper unit 11 is limited to the range of the amount of power that can be charged to or discharged from the power storage device 12 at that time. By using a power command value of this kind, it is sufficient simply to control the output current amount of the inverter 4 on the basis of the power command value, and therefore the control processing load can be reduced.

When constructing a large-scale solar power generation system 10, which is known as a mega solar power system, it is generally necessary to have approximately 2-hectare flat ground for each MW of generated power, when installing the solar cell groups 2a, 2b to 2n. If the ground is not flat, then the power generation characteristics of the solar cell groups 2a, 2b to 2n vary greatly depending on their installation location. Therefore, it is considered to be difficult to control the plurality of solar cell groups 2a, 2b to 2n in the mega solar power system (solar power generation system 10) simultaneously.

In this respect, when the plurality of solar cell groups 2a, 2b to 2n are divided into groups having similar characteristics, and are each provided with a chopper unit 3a (3b to 3n), then the aforementioned mega solar power system can be achieved even on ground that is not flat. Furthermore, at the same time, the inverters 4 may also be provided in groups having similar characteristics. However, when constructing a mega solar power system in this way, complicated control is required in order to coordinate these groups, then a plurality of detection systems for detecting the tri-phase voltage and current of each group, and control systems for controlling the respective currents are required, and therefore the complexity is increased. Furthermore, since the power distribution devices in the AC section are also divided, then the configuration inevitably becomes large in scale. Moreover, the power transmission cable in the AC section becomes long, and a problem of voltage variation occurs due to the inductance of the cable.

In this respect, according to the solar power generation system 10 relating to the present invention having the configuration described above, the control relating to the chopper units 3a (3b to 3n) is simple and reliable, the configuration of the control system and detection system is also simple, and furthermore the system can be constructed at relatively low cost. Therefore, problems such as those described above do not occur. Moreover, since power is supplied from the solar cell groups 2a, 2b to 2n to the inverter 4 as DC power, then there is no occurrence of the problem of voltage variation due to the inductance as described above.

Moreover, a mega solar power system of this kind naturally employs a configuration in which the system power supply itself is disposed in a distributed fashion, and is merged in a power collector unit. Therefore, by providing the chopper units 3a (3b to 3n) in the power collector unit, controlling the solar cell groups 2a, 2b to 2n respectively and independently, and also converting the power to AC by a single inverter 4, then it is possible to restrict the equipment load required, to a minimum.

In particular, if SiC elements, or the like, which are power semiconductor elements based on silicon carbide (SiC), for example, are used for the switching elements whereby high frequency switching is implemented, then the chopper units 3a (3b to 3n) can be reduced in size. Consequently, it is also possible to house the chopper units 3a (3b to 3n) in the existing power collector unit. Furthermore, the loss in the chopper units 3a (3b to 3n) can also be reduced to a virtually negligible level, and consequently there is hardly any risk of problems such as decline in the conversion efficiency, or the like. Hence, by using the solar power generation system 10 relating to the present invention, many significant beneficial effects are obtained in practical use, for instance, a mega solar power system can be constructed easily and inexpensively even on ground that is not flat.

The present invention is not limited to the various examples described above. For example, it is sufficient if the number of solar cell groups 2a, 2b to 2n and the rating of the solar cell groups 2a, 2b to 2n correspond to the power specifications of the solar power generation system 1, 10. Furthermore, the various methods suggested in the related art may also be adopted, as appropriate, for the chopper units 3a, 3b to 3n and the inverter 4, in accordance with the power specifications thereof. In summary, the present invention can be implemented with various modifications within a scope that does not depart from the essence of the invention.

What is claimed is:

1. A solar power generation system, comprising:
    a plurality of solar cell groups each of which includes a plurality of solar cells;
    a plurality of chopper units each of which corresponds to one of the plurality of solar cell groups and raises a DC voltage obtained from the corresponding solar cell group, each of the plurality of chopper units including a first operating point control unit, the first operating point control unit being configured to perform a first operating point control that respectively controls an output current of a corresponding chopper unit to optimize an operating point of the corresponding solar cell group so as to obtain maximum power from the respective solar cell groups;
    an inverter, which receives the DC voltage obtained from the plurality of chopper units as an input voltage and outputs AC power, the inverter including a second operating point control unit, the second operating point control unit being configured to perform a second operating point control that controls the input voltage to optimize an operating point of one or more of the plurality of solar cell groups on which the first operating point control is not performed;
    a bi-directional chopper unit capable of bi-directional power flow; and
    a power storage device connected to an input terminal of the inverter via the bi-directional chopper unit,
    wherein the bi-directional chopper unit
        stores surplus electric power obtained from the plurality of chopper units in the power storage device when electric power supplied to the inverter from the plurality of chopper units is greater than a predetermined value,
        outputs electric power from the power storage device to the inverter when the electric power supplied to the inverter from the plurality of chopper units is insufficient, and
        inputs to the inverter information of charging the power storage device with the surplus electric power to be stored or information of discharging of the electric power to be supplied to the inverter, and
    wherein the second operating point control unit controls, based on the information of the charging or the discharging, a controlling speed of the second operating point control such that a controlling speed for the charging with the surplus electric power and the discharging of electric power, which is carried out by the bi-directional chopper unit is slower than the controlling speed of the second operating point control.

2. The solar power generation system according to claim 1, wherein, when all of the first operating point control units perform the first operating point control, the second operating point control unit sets the input voltage of the inverter to a fixed value within a search range for the operating point of each of the plurality the solar cell groups.

3. The solar power generation system according to claim 1, wherein
    each of the plurality of chopper units raises the DC voltage obtained from the corresponding solar cell group by a switching operation in a normal mode, and halts the switching operation in a through mode and outputs the output current without raising the DC voltage obtained from the corresponding solar cell group, and
    when a total DC voltage obtained from the plurality of solar cell groups exceeds a predetermined voltage, at least one of the plurality of chopper units is in the through mode.

4. The solar power generation system according to claim 1, wherein each of the plurality of chopper units includes a short circuit that shorts an input terminal and an output terminal of the corresponding chopper unit, and when a total DC voltage obtained from the plurality of solar cell groups exceeds a predetermined voltage, at least one of the plurality of chopper units outputs the output current through the short circuit without raising the DC voltage obtained from the corresponding solar cell group.

5. The solar power generation system according to claim 1, wherein each of the first operating point control unit performs maximum power point tracking (MPPT) of the corresponding solar cell group.

6. The solar power generation system according to claim 3, wherein the second operating point control unit performs maximum power point tracking (MPPT) of a specific one of the plurality of solar cell groups when a chopper unit that obtains the DC voltage from the specific solar cell groups is in the through mode.

7. The solar power generation system according to claim 4, wherein the short circuit is formed by any one of, or combination of, a rectifying diode, a mechanical contact switch, and a synchronous rectifying circuit using a semiconductor switching element.

\* \* \* \* \*